United States Patent [19]

Jarret et al.

[11] Patent Number: 4,543,502
[45] Date of Patent: Sep. 24, 1985

[54] MAGNETIC RING FOR FREE PISTON RECTILINEAR GENERATORS

[76] Inventors: Jacques H. Jarret, 32 allée des Soudanes, 78430 Louveciennes, Yvelines; Jean-Marie B. Jarret, 21 avenue Foch, 75116 Paris, both of France

[21] Appl. No.: 602,151

[22] Filed: Apr. 19, 1984

[30] Foreign Application Priority Data

Apr. 20, 1983 [FR] France ................ 83 06447

[51] Int. Cl.$^4$ ............................................ H02K 33/00
[52] U.S. Cl. ........................................ 310/15; 310/42; 310/217
[58] Field of Search .................. 310/216–218, 310/42, 261, 254, 264, 15, 17, 111, 12, 19; 322/3, 46, 49–52, 100; 320/14, 21, 61

[56] References Cited

U.S. PATENT DOCUMENTS

| | | | |
|---|---|---|---|
| 3,591,819 | 7/1971 | Laing | 310/217 |
| 3,814,963 | 6/1974 | Laing | 310/217 |
| 3,955,272 | 5/1976 | Hallerback | 310/217 X |
| 4,227,142 | 10/1980 | Jarret et al. | 310/15 X |
| 4,249,099 | 2/1981 | Bhongbhibhat | 310/217 |

FOREIGN PATENT DOCUMENTS 7517905  7/1975  France .

Primary Examiner—Mark O. Budd
Attorney, Agent, or Firm—Browdy and Neimark

[57] ABSTRACT

The generator comprises at least one coil surrounded by a magnetic circuit of an inductor for taking-off electrical power. The magnetic circuit forms a variable gap with a reciprocating mobile part moving between two positions. The mobile reciprocating part is made in the form of a magnetic ring made by sheets of ferro-magnetic material having a uniform thickness and width and being radially positioned. The distance between the sheets at the proximity of a residual gap is such that ferro-magnetic material in area of the residual gap represents from 50 to 80% of the sheets in the magnetic circuit of the inductor.

4 Claims, 5 Drawing Figures

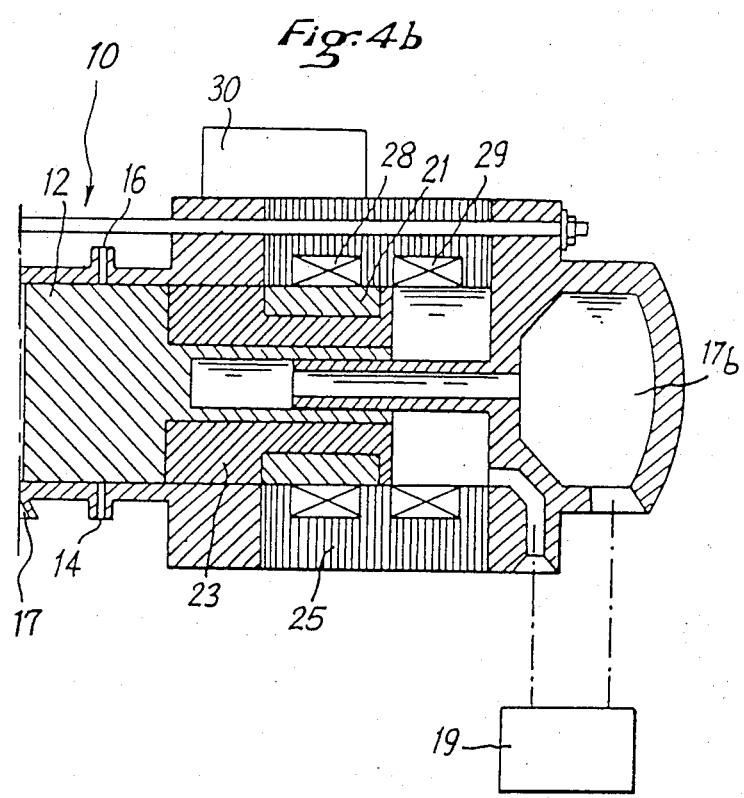

MAGNETIC RING FOR FREE PISTON RECTILINEAR GENERATORS

FIELD OF THE INVENTION

The present invention relates to a pulse excited generator and is more particularly applicable to free piston rectilinear generators.

There is known that for some free piston heat engines using no connecting rods, generators are used for transforming mechanical power into electrical power, these generators comprising a double cylindrical coil inductor and a piston with a mobile magnetic ring moving within the inductor according to a rectilinear path.

BACKGROUND OF THE INVENTION

In U.S. Pat. No. 4,229,142, a pulse excited alternator has already been described comprising at least one coil surrounded by a magnetic circuit forming a gap with the magnetic ring of a piston moving between two positions, this gap having a length which varies as a function of the piston displacement. Ends of the coil are respectively connected to the positive and negative terminals of a constant voltage current source through two electronic gates controlled by a pulse device, unidirectional connections being moreover provided between each end of the coil and the opposite terminal of the current source.

The present invention relates to providing a magnetic coil which makes it possible to obtain a better ratio than previously between the power transferred upon each cycle and the mass of said magnetic ring.

For a given stroke of the magnetic ring upon its rectilinear displacement, the amount of power which is transferred is proportional to the mechanical forces exerted between the inductor and the mobile magnetic ring, and is particularly proportional to the component of these forces which is parallel to the direction of movement. This component, for a given front cross-section of magnetic material, is proportional to the magnetic field formed within the main gap which is no more than the volume swept by the displacement of the magnetic ring. Yet, it is necessary that such a magnetic field of a high magnitude be obtained by passage of the current in the coils without saturation of the ferromagnetic material circuit surrounding the coils and which localizes the useful fields in the main gap. These facts lead simultaneously to a saturation of the magnetic material of the ring without the fixed magnetic circuit of the inductor itself being saturated.

The present invention solves these problems, and permits also the reduction of the weight and the cost of a rectilinear generator of the type of that described in the above patent.

According to the invention, the generator comprises a mobile part made in the form of a magnetic ring constituted by ferromagnetic material sheets of a uniform thickness and width, and which are radially and regularly positioned.

According to another feature of the invention, the spacing between the sheets in the proximity of a residual gap formed between the magnetic ring and the opposite wall of the inductor is such that the proportion of ferromagnetic material of the magnetic ring in the area of the residual gaps represents 50 to 80% of the proportion of the sheets in the magnetic circuits of the inductor.

The invention relates also to a process for making the magnetic ring which is obtained by placing into a mold previously cut and bent sheets, the bent part of each sheet being placed in the mold symmetrically with respect to the bent part of the neighbouring sheets.

Various other features of the invention will moreover be revealed from the following detailed description.

BRIEF DESCRIPTION OF THE DRAWINGS

Embodiments of the invention are shown as non limitative example in the accompanying drawings, in which:

FIGS. 4a and 4b are two half cross-sectional elevations of the generator according to the invention, each viewed in a characteristic position of the generator.

DESCRIPTION OF THE PREFERRED EMBODIMENT

Figure 1:
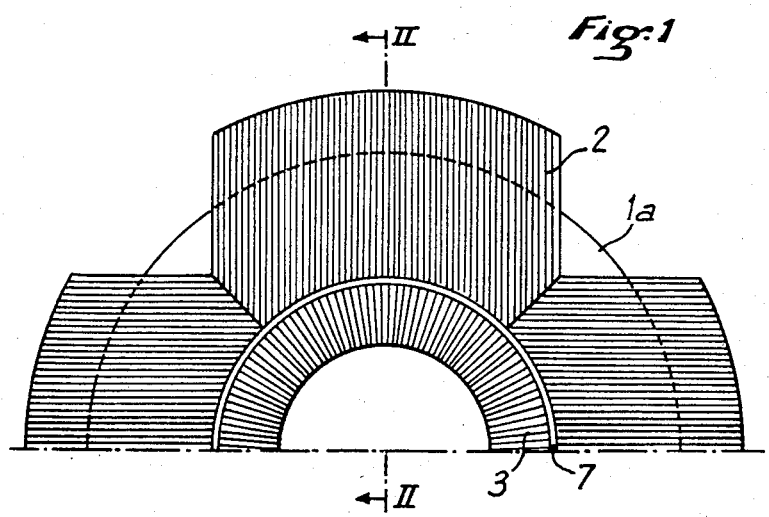
FIG. 1 is a diagrammatic half-cross sectional view of a generator according to the invention.
Figure 2:
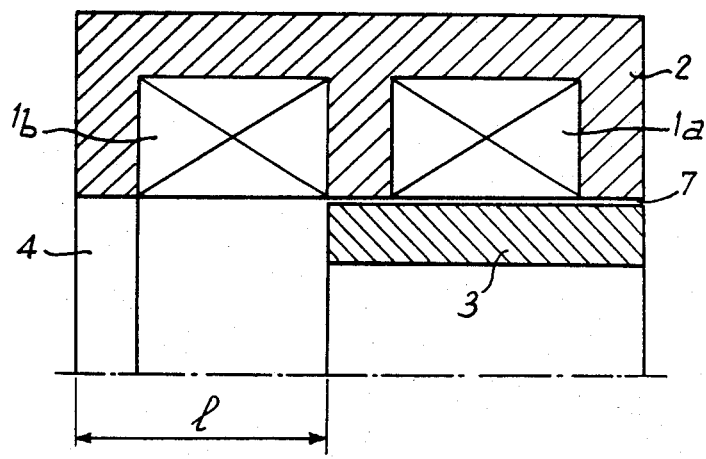
FIG. 2 is a cross-sectional elevation of the generator taken along line II—II of FIG. 1.

In the drawings, FIGS. 1 and 2 diagrammatically show a generator according to the invention. Each coil 1a, 1b of the generator is surrounded by a magnetic circuit or inductor 2 made of laminated iron sheets which form, with a mobile part 3 made in the form of a ring of laminated ferromagnetic sheets, a gap 4 the length of which varies as a function of the displacement of the mobile part.

Figure 3:
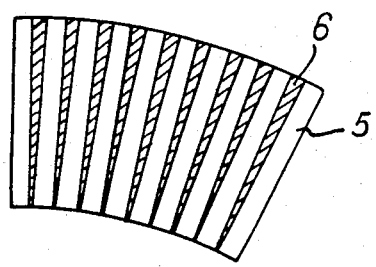
FIG. 3 is an enlarged partial cross-section of the magnetic ring of FIG. 1.

FIG. 3 shows a partial cross-section of the magnetic ring forming the mobile part 3. The magnetic ring 3 is made of radial sheets 5 of ferromagnetic material spaced by isolating members 6.

According to the invention, the sheets 5 of the magnetic ring 3 have a uniform thickness and width and are radially positioned. The width of the sheets 5 of the magnetic ring 3 is chosen in such a manner that the sheets 5 are very near together each other in their parts nearest to the central axis of the magnetic ring and regularly spaced one from the other in their parts nearest to the inductor 2. The distance between the sheets 5 in proximity to a residual gap 7 is such that the proportion of ferromagnetic material in this area represents 50 to 80% of the proportion of sheets in the magnetic circuits of the inductor 2.

In order that the part of the sheets 5 of the magnetic ring 3 which is at the right of a coil 1a, 1b is crossed through by a current is suitably saturated, the width of each sheet 5 is substantially equal to that of the sheets of the fixed magnetic circuit in proximity of the residual gap 7. The cross-section of saturated iron is therefore equal to the constant cross-section of each sheet of the ring multiplied by the number of sheets which can be radially mounted according to the previously indicated provisions. The ratio of the front cross-section of the magnetic material of the ring 3 to the developed surface area of the magnetic material of each arm of the inductor 2 at right of the residual gap 7 enables the evaluation of the maximum magnetic field which can be localized in the main gap 4 without saturation of the magnetic circuit of the inductor 2.

For making a magnetic ring according to the invention, rectangular magnetic sheets are used, these sheets being cut each to a size slightly greater than that of the magnetic ring which it is desired to obtain. For example, a ferrocobalt sheet of 0.2 mm thickness is cut into rectangles of 12.2 mm×62.4 mm. The sheets are slightly bent and introduced into a mold of a suitable size while taking care of reversing the bending direction for each of the sheet with respect to the neighbouring sheets. The spring effect which is then obtained provides to the sheets a radial disposition, such as that diagrammatically shown in FIG. 3, and which could be made but with difficulty by any other means. When the totality of the sheets has been positioned in the mold, an isolating and glueing product is injected which, after curing, yields the isolating member 6 of FIG. 3 and maintains the sheets together while enabling a later final machining of the magnetic ring to the desired dimensions.

The ferromagnetic material which is used is preferably either a ferrocobalt alloy, as previously indicated, or a silicon iron with oriented grains which is a heavier material but is cheaper than ferrocobalt alloys.

Figure 4A:
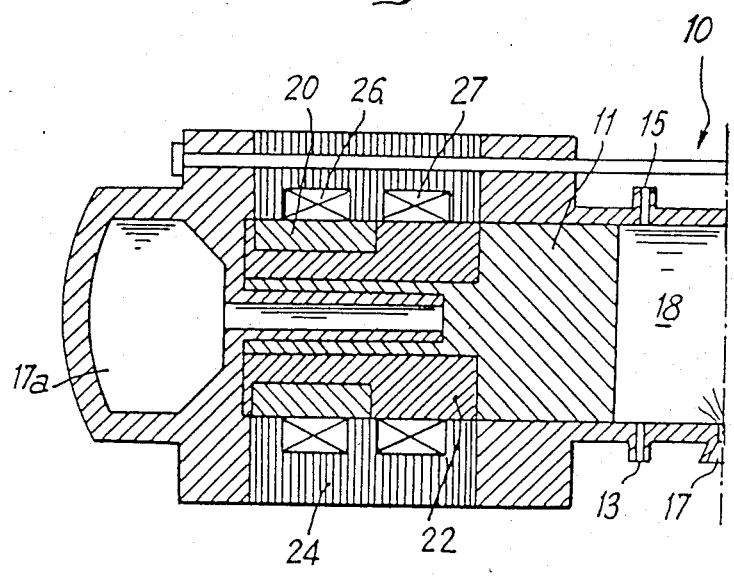

FIGS. 4a and 4b show two views of an embodiment of a generator realized according to the preceding figures.

In FIGS. 4a and 4b, the generator comprises a single heat cylinder 10 in which are moving two cylindrical mobile parts 11 and 12.

The heat cylinder 10 has inlet apertures 13 and 14, outlet apertures 15 and 16, and a central nozzle 17. The mobile parts 11 and 12 symmetrically oscillate between, on the one hand, an outer dead point which is reached when the opposite faces of the pistons of the mobile parts have compressed a liquid contained in the chambers 17a and 17b of two returning elastic hydraulic devices (FIG. 4a) and, on the other hand, an inner dead point which is reached when the working faces of the pistons are stopped at a distance of about 2 mm the one from other after having compressed the fuel mixture introduced at 17 in the variable volume median chamber 18 which is formed therebetween and before the moment when the fuel mixture will return the pistons (FIG. 4b). In the drawings, the chambers 17a and 17 b containing the returning liquid have been diagrammatically shown as connected to a liquid source 19.

Each mobile part 11, 12 comprises a magnetic ring 20 and respectively 21, similar to the magnetic ring 3 of FIGS. 1 and 2. The magnetic rings 20 and 21 are crimped in a non magnetic material 22, 23 and they are adapted for movement during the alternate movement of the mobile parts 11, 12 in front of a laminated annular inductor 24 and respectively 25, similar to the inductor 2 of FIGS. 1 and 2.

As in the embodiment diagrammatically shown in FIGS. 1 and 2 with respect to the coils 1a and 1b, coils 26, 27 and 28, 29 are mounted in parallel into notches of the magnetic circuit of the inductors 24 and 29. As shown, when the magnetic ring 20 related to the mobile part 11 is placed in front of one of the coils 26 and 27, the nonmagnetic part is placed in front of the other coil. The same is true for the magnetic ring 21 relatively to the coils 28 and 29.

The coils 26, 27 and respectively 28, 29 in connection with the magnetic rings 20 and 21 form starting means for starting the generator, tuning means for enabling symmetrical displacement of the mobile parts 11 and 12, as well as a source of electrical power given by the working of the generator and which is taken from the mobile parts on one way and the other of their alternate reciprocating movements.

In a manner similar to that which has been explained in the above U.S. Pat. No. 4,229,142, the entire generator is excited from a device diagrammatically shown at 30 and the ends of the coils are respectively connected to the positive and negative terminals of a constant current source through electronic gates controlled by a pulse device; moreover unidirectional connections are provided between each end of the coils and the opposite terminal of the current source.

As an example, and by referring to FIGS. 4a, 4b, a current generator can be made according to the invention and in which the stroke (l in FIG. 2) of the magnetic ring 20, 21 will be 50 mm, the length of the inductor 24, 25 will be 112 mm with two coils 26,27 and respectively 28, 29 of 38 mm each, so that the length of each arm of the inductor 24, 25 will be equal to one third of 112 mm$-2\times38$ mm, i.e. 12 mm. The length of the magnetic ring 20, 21 will then be 62 mm corresponding to a coil length of 38 mm plus two magnetic arm widths of 12 mm. Still as an example, according to the invention the magnetic ring 20, 22 will be made of a certain number of ferromagnetic sheets as the sheets 5 of FIG. 3, the sheets being radially positioned, and each having a cross sectional area determined by the product of 0.2 mm thickness and 12 mm height.

If the radial sheets of the magnetic ring 20, 21 are respectively separated by isolating members (as for example the isolating member 6 of FIG. 3), the thickness of which should vary from 0.01 mm in their nearest portions from the central axis of the ring to 0.13 mm in their nearest portions from the inductor. The inner diameter of the magnetic ring will be of 42 mm and the outer diameter of 66 mm, the inner diameter of the inductor 24, 25 being then of 66.3 mm for permitting a rectilinear displacement of the magnetic ring 20, 21.

The front cross-section of ferromagnetic material (for example a ferro-cobalt alloy having a saturating induction of 2.3 tesla) will have $42\pi/0.21=628$ sheets. Each of the sheets having a surface area in mm$^2$ equal to $0.2\times12$, the 628 sheets have a surface area of $0.2\times12\times628=1\ 507$ mm$^2$.

On the other hand, the developed surface area of each arm of the inductor 24,25 (length 12 mm and diameter 66.3 mm) will be equal to $66.3\pi\times12=2\ 500$ mm$^2$.

If the maximal induction through the cross-section of 2 500 mm$^2$ of each arm of the inductor is limited to 1.8 tesla, the maximum magnetic flux will be of $1.8\times2\ 500\times10^{-6}=0.0045$ Weber ($10^{-6}$ being a coefficient corresponding to the SI system). The induction into the sheets of the magnetic ring 20, 21 will therefore be substantially of $0.0045/1\ 507\times10^{-6}=2.986$ tesla. The saturating induction of the sheets being of 2.3 tesla, the maximum magnetic field will correspond to an induction of $2.986-2.3=0.686$ tesla and its value can reach $0.686/4\pi\times10^{-7}$ ($4\pi\times10^{-7}$ being a coefficient corresponding to the SI system) i.e. 548 800 amperes per meter without overpassing the desired maximum induction of 1.8 tesla in the arms of the inductor 24, 25.

The quantity of electric power which may be transferred by the generator during one half-a-cycle is equal to the product of the number of amperes/turns and the variation of magnetic flux in the part of the circuit in question. The number of amperes/turns is at a maximum the number which permits to reach the maximum magnetic field of 548 800 amperes per meter as above, i.e. $548\ 800\times0.038$ (0.038 being the length in meter of a coil) or 20 854 amperes/turns. The average mean value is substantially equal to 60% of the above value, i.e. equal to 12 512 amperes/turns. The variation of magnetic flux within each coil 26, 27 and respectively 28, 29 is equal to the product of the ferric induction by the area of the front cross-section of ferro-cobalt alloy of the magnetic ring 20, 21, i.e. $2.3 \times 1507 \times 10^{-6} = 0.003466$ Weber. The quantity of power transferred for one cycle will thereforebe of $2 \times 12512 \times 0.003466 =$ about 87 joules for a ferromagnetic mass of the ring of $0.62 \times 0.1507 \times 8.12 = 0.759$ kg (0.1507 representing, as above mentioned, the cross-sectional area in dm$^2$ of the 628 sheets and 8.12 the specific weight of the sheets of the ring, while 0.62 is the length of the ring in dm), this mass of 0.759 kg moving of $l = 50$ mm upon each half-cycle.

In a linear generator according to the generator shown in FIGS. 4a and 4b, a unitary mass of magnetic ring of 0.759 kg permits to realize mobile parts 11 and 12 having a unitary mass of about 1.8 kg authorizing an oscillating frequency of 150 hertz. The power transferred by the two magnetic rings 20 and 21 will then reach $87 \times 2 \times 150 = 26\,000$ Watts (about).

The ratio between the obtained power and the mass of the magnetic rings is equal to $(26\,000/0.759) \times \frac{1}{2} = 17\,128$ watts/per kg (about) which is very remarkable being considered that the mean speed of the mobile parts is only, by hypothesis, (for a stroke of 50 mm at 150 Hz) of $0.05 \times 2 \times 150 = 15$ meters per second.

What is claimed is:

1. A generator comprising at least one coil surrounded by a magnetic circuit of an inductor for taking-off electrical power, said magnetic circuit forming a gap with a reciprocating mobile part moving between two positions, said gap having a length which varies with displacement of the mobile part, the mobile reciprocating part being made in the form of a magnetic ring with sheets of ferro-magnetic material having a uniform thickness and width and being radially and regularly positioned, the distance between the sheets in the proximity of a residual gap between the magnetic ring and the opposite wall of the magnetic circuit of the inductor being such that the proportion of ferro-magnetic of the magnetic ring in area of said residual gap represents from 50 to 80% of the proportion of sheets in the magnetic circuit of the inductor.

2. The generator as set forth in claim 1 comprising two coils placed in parallel into notches of the magnetic circuit of the inductor so as to take-off power from the mobile part in two directions of movement of said mobile part, whereby obtaining a better continuity of the current so produced.

3. The generator as set forth in claim 1, wherein the mobile part corresponds to a magnetic mobile part of a free piston heat engine.

4. The generator according to claim 1, wherein the sheets of the magnetic ring have a width substantially equal to width of the sheets of the magnetic circuit of the inductor in the proximity of said residual gap.

* * * * *